(12) United States Patent
Chang

(10) Patent No.: US 7,171,367 B2
(45) Date of Patent: Jan. 30, 2007

(54) DIGITAL AUDIO WITH PARAMETERS FOR REAL-TIME TIME SCALING

(75) Inventor: Kenneth H. P. Chang, Foster City, CA (US)

(73) Assignee: SSI Corporation, Tokyo (JP)

( * ) Notice: Subject to any disclaimer, the term of this patent is extended or adjusted under 35 U.S.C. 154(b) by 546 days.

(21) Appl. No.: 10/010,514

(22) Filed: Dec. 5, 2001

(65) Prior Publication Data

US 2003/0105640 A1  Jun. 5, 2003

(51) Int. Cl.
  *G10L 21/04* (2006.01)
  *G10L 21/00* (2006.01)
(52) U.S. Cl. ..................................... 704/503
(58) Field of Classification Search ............... 704/503, 704/267
See application file for complete search history.

(56) References Cited

U.S. PATENT DOCUMENTS

| | | | | |
|---|---|---|---|---|
| 4,885,791 A * | 12/1989 | Fujii et al. | ................... | 704/254 |
| 5,175,769 A * | 12/1992 | Hejna et al. | ................. | 704/211 |
| 5,809,454 A * | 9/1998 | Okada et al. | ................ | 704/214 |
| 5,828,994 A | 10/1998 | Covell et al. | | |
| 5,920,840 A * | 7/1999 | Satyamurti et al. | ......... | 704/267 |
| 5,995,925 A * | 11/1999 | Emori | ........................ | 704/208 |
| 6,484,137 B1 * | 11/2002 | Taniguchi et al. | .......... | 704/211 |
| 6,718,309 B1 * | 4/2004 | Selly | ............................ | 704/503 |
| 6,766,300 B1 * | 7/2004 | Laroche | ...................... | 704/500 |
| 2002/0101368 A1 * | 8/2002 | Choi et al. | .................... | 341/61 |
| 2004/0122662 A1 * | 6/2004 | Crockett | ................... | 704/200.1 |

FOREIGN PATENT DOCUMENTS

| | | |
|---|---|---|
| EP | 0605348 A2 | 7/1994 |
| EP | 0652560 A1 | 5/1995 |
| EP | 0605348 A3 | 3/1996 |
| EP | 0813183 A2 | 12/1997 |
| EP | 0813183 A3 | 1/1999 |
| WO | WO 02/082428 A1 | 10/2002 |
| WO | WO 02/093560 A1 | 11/2002 |

OTHER PUBLICATIONS

Roucos, S. Wilgus, A. "High Quality time-scale modification of speech" Acoustics, Speech and Signal Processing Apr. 1985, vol. 10, pp. 493-496.*

Anonymous: "Compression Method for Voice Preprocessing and Postprocessing" vol. 29, No. 4, Sep. 1, 1986, pp. 1756-1757 XP002133248.

* cited by examiner

Primary Examiner—David Hudspeth
Assistant Examiner—Matthew J. Sked
(74) Attorney, Agent, or Firm—David T. Millers

(57) ABSTRACT

Preprocessing audio data to generate parameters associated with time scaling reduces the processing power required for real-time time scaling of the audio data. An augmented audio data structure includes the audio data and the parameters. The parameters for a frame of the audio data can identify best match blocks for time scaling or represent a plot of offset versus time scale that can be interpolated to determine an offset. The real-time time scaling uses the blocks that the parameters identify instead of performing a search for the best matching blocks. The parameters can also indicate which of the frames represent silence and can be scaled differently from frames that do not represent silence.

20 Claims, 5 Drawing Sheets

DIGITAL AUDIO WITH PARAMETERS FOR REAL-TIME TIME SCALING

BACKGROUND

Time scaling (e.g., time compression or expansion) of a digital audio signal changes the play rate of a recorded audio signal without altering the perceived pitch of the audio. Accordingly, a listener using a presentation system having time scaling capabilities can speed up the audio to more quickly receive information or slow down the audio to more slowly receive information, while the time scaling preserves the pitch of the original audio to make the information easier to listen to and understand. Ideally, a presentation system with time scaling capabilities should give the listener control of the play rate or time scale of a presentation so that the listener can select a rate that corresponds to the complexity of the information being presented and the amount of attention that the listener is devoting to the presentation.

A time scaling system generally requires a significant amount of processing power for real-time conversion of prerecorded digital audio data into a time-scaled digital audio data stream. Accordingly, many systems with limited processing power, such as portable telephones are unable to perform real-time time scaling of audio, and such systems must rely on a source that provides a time-scaled signal having the desired time scale. Further, user selection of the time scale requires that the source of time-scaled audio be able to promptly respond to a change in the selected time scale and provide the time-scaled audio data at the correct time scale.

U.S. patent application Ser. No. 09/849,719, entitled "Real-Time Control of Playback Rates in Presentations" describes a method for providing real-time control of play rates through a source having multiple channels of time-scaled digital audio, with each channel corresponding to a different time scale. Such methods allow transmission of the desired time-scaled data over a network to a receiver having low processing power. However, having many different time scales and associated audio data channels at the source requires a large data structure. Alternative methods that provide smaller data structures and still permit real-time time scaling in systems having low available processing power are sought.

SUMMARY

In accordance with an aspect of the invention, an augmented digital audio data structure provides time scaling parameters that reduce the processing burden of time scaling the audio and thereby allow a low processing power receiver/player to perform time scaling while playing time-scaled audio that has good sound quality. One type of the time scaling parameter indicates time offsets to audio segments used in the time scaling process, and use of the offsets eliminates the need to search for the audio segments that provide the best sound quality for the time-scaled audio. Another type of time scaling parameter classifies the contents of audio frames, for example, indicating which frames correspond to silence, and a time scaling process can employ different techniques or time scales when processing different classes of frames. Other types of time scaling parameters depend on the time scaling process used.

To generate the augmented audio data, a preprocessing system uses time scaling processes to generate the time scaling parameters. The augmented audio data structure including the time scaling parameters can be recorded for later use or immediately transmitted to a presentation system. The presentation system uses the preprocessed time scaling parameters to avoid calculation-intensive procedures when time scaling and playing time-scaled audio. A low power system thus can perform real-time time scaling of the audio data and provide good sound quality. Additionally, the time scaling parameters associated with a particular time scale require very little additional storage or transmission bandwidth when compared to the audio data. Accordingly, the audio data augmented with time scaling parameters can be stored in systems having limited available memory and transmitted in systems having limited available bandwidth.

In one embodiment of the invention, the added parameters indicate time offsets to "best match" data blocks that are used in generating the time-scaled audio data. Generally, a search for the best match blocks requires most of the processing power consumed in a time scaling process. Accordingly, a system having available processing power that is more than an order of magnitude less than the processing power normally required for real-time time scaling can receive the augmented audio data with parameters, identify the best match blocks without a search, and perform real-time time scaling.

In another embodiment of the invention, the parameters in the augmented data structure classify the audio content of each section or frame of audio data, and a non-linear scaling of the audio data can apply different time scaling processes or time scales to different sections according to the audio content of the frames. In one specific embodiment, the parameters in the augmented audio data structure include flags that identify frames that correspond to silence. When playing the audio data, the frames that correspond to silence can be dropped, more aggressively scaled, or otherwise specially treated to achieve a desired time scaling of the audio data.

One specific embodiment of the invention is a process that includes preprocessing of audio data to determine parameters associated with time scaling of the audio data. The audio data and the parameters can be provided to a presentation system on a storage media such as a CD or DVD that the presentation system can read, or the presentation system can receive the audio data and the parameters via a network such as a telephone network, a LAN, or the Internet. The presentation system uses the parameters when time scaling the audio data to generate a time-scaled audio data stream. The time scaling process using the preprocessed time scaling parameters requires less processing power than would time scaling of the audio data without the time scaling parameters. Accordingly, a lower power presentation system can perform real-time time scaling.

Typically, the audio data has input frames containing audio samples, and the parameters include offsets to blocks of samples. Generally, each offset identifies a block of samples for use in generating time-scaled audio data from the input frame. Multiple offsets can be determined for each frame, where each offset for a frame corresponds to a different time scale.

Another embodiment of the invention is an audio time scaling process that includes receiving a frame of audio data with parameters indicating a plot of offset versus time scale, using the parameters to determine an offset that is on the plot and corresponds to a selected time scale, and generating a time-scaled frame using samples in a block identified by the offset. The parameters can be predetermined offsets that are on the plot and respectively correspond to different time scales. When a user selects a time scale that is not one of the time scales for which an offset is provided, interpolating the plot between the predetermined offsets can determine the offset corresponding to the selected time scale.

Yet another embodiment of the invention is an augmented audio data structure. The augmented audio data structure includes frames corresponding to different sections of audio and one or more parameters associated with the frames. Each frame includes samples of the corresponding section of audio, and the parameters provide information that simplifies the time scaling of the audio data. In particular, an "offset" parameter for a frame can identify a block of the samples that is used to generate time-scaled data. Each audio frame can have multiple offsets that respectively correspond to different time scales, and each offset for a frame identifies a block of the samples that is combined with the frame when time scaling the frame at the time scale associated with the offset.

Although a low processing power player can use the time scaling processes and augmented audio data structures described above to perform real-time time scaling, a high power processing system such as a server can also employ the time scaling processes and augmented audio data structure for real-time construction of time scaled data. The server can then provide only the time-scaled data to a player in a system having a limited transmission bandwidth for the audio data.

BRIEF DESCRIPTION OF THE DRAWINGS

Use of the same reference symbols in different figures indicates similar or identical items.

DETAILED DESCRIPTION

In accordance with an aspect of the invention, an augmented audio data structure includes digital audio data and parameters to reduce the processing power required for performing time scaling on the digital audio data.

Figure 1:
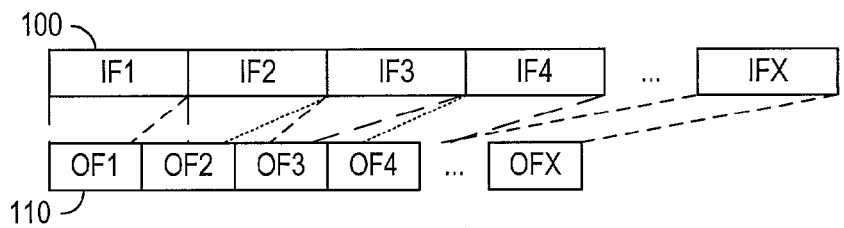
FIG. 1 illustrates time-scaled audio data frames output from time scaling of input audio data frames.

FIG. 1 illustrates digital audio data 100 that is partitioned into input frames IF1 to IFX. In an exemplary embodiment, each input frame contains a fixed number m of samples of a sound signal and requires a fixed amount of time T to be played at the normal play rate. In particular, the time T corresponding to each input frame is equal to the number of samples m in the frame divided by the sampling frequency for the playback operation.

A time scaling process such as described further below converts digital audio data 100 and input frames IF1 to IFX into time-scaled digital audio data 110 having output time-scaled frames OF1 to OFX. The number n of samples per output frame is equal to the number m of samples per input frame divided by a time scale S. Accordingly, with a time scale S equal to 2, each output frame OF1 to OFX contains half as many samples as the respective input frames IF1 to IFX, and playing the time-scaled data 110 takes one half of the time required to play input data 100 using the same sampling frequency for both. With a time scale S equal to 0.5, each output frame OF1 to OFX contains twice as many samples as the respective input frames IF1 to IFX, and playing the time-scaled data 110 takes twice the time required to play input data 100 using the same sampling frequency for both. For time scales greater than one (e.g., time compression), time-scaled data 110 conveys more information (e.g., spoken words, music, etc.) per unit time than would audio data 100 played at the normal rate. Time scaling achieves this higher information rate by removing redundant data that normal audio recordings of speech and music contain. Alternatively, with a time scale less than one, time scaling expands input audio frames so that the output time-scaled audio frames contain more samples and take longer to convey information. For example, with a time scale of 0.5, time scaling effectively adds redundant information, and the audio data takes twice as long to play.

Figure 2:
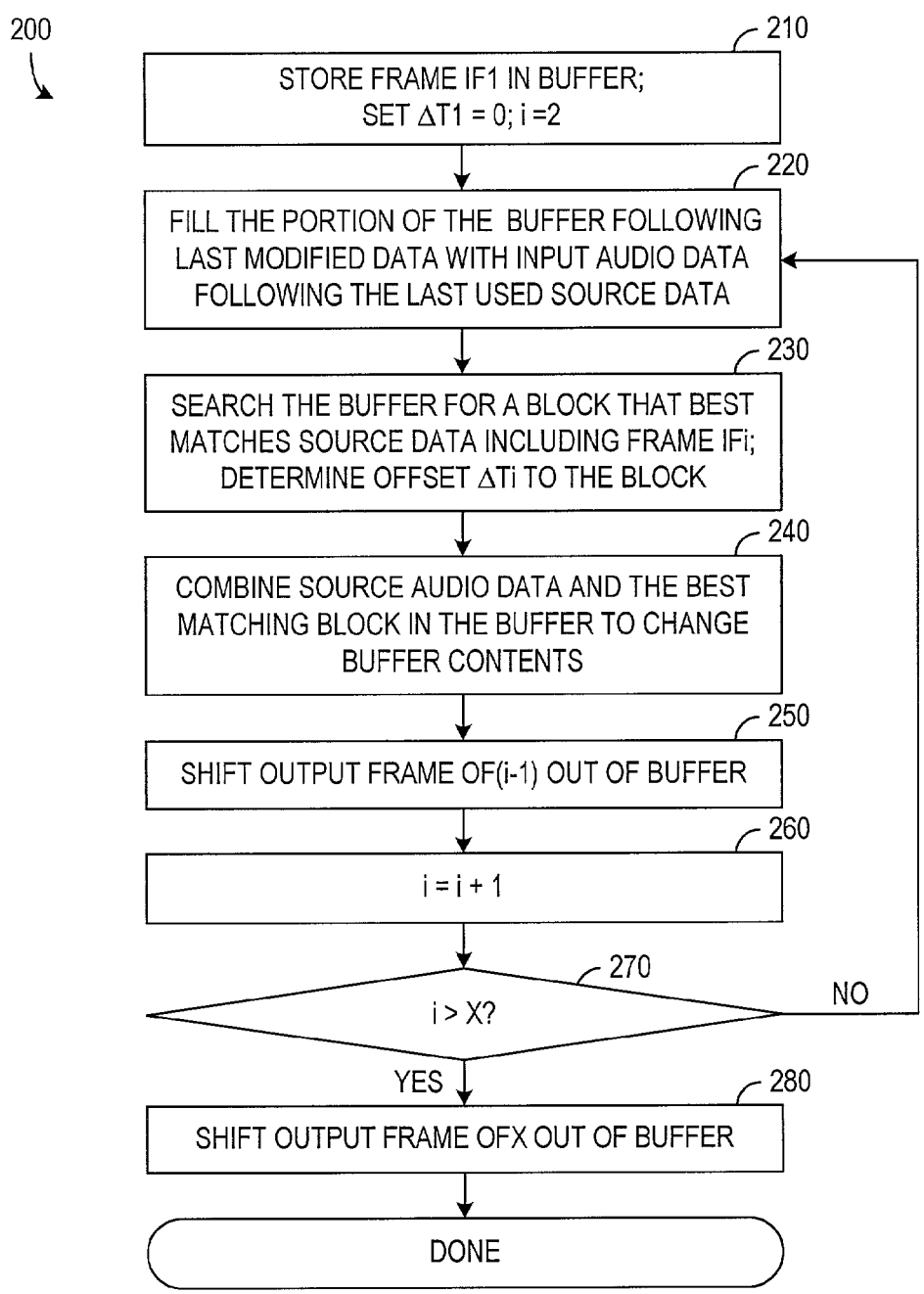
FIG. 2 is a flow diagram of a time scaling process.

FIG. 2 is a flow diagram of an exemplary time scaling process 200 that generates time-scaled audio data 110 from input audio data 100. Initially, a step 210 stores a first input frame IF1 at the beginning of a buffer, initializes a frame index i to 2, and sets an offset $\Delta T1$ for the first input frame to zero. The size of the buffer can be selected according to the time scale. Generally, the storage capacity of the audio buffer is at least the greater of 2m and 2n, where input frames contain m samples and output frame contain n samples. In the following, a data block size g is equal to the greater of the input frame size m and the output frame size n (e.g., g=max {m, n}. Accordingly, the buffer typically has a size 2g.

Step 220 fills the buffer with input data starting with the input data following the last used source data and stores the input data in the buffer beginning at a storage location immediately after the last modified data in the buffer. In the first execution of step 220, input data including input frame IF2 is stored in the buffer immediately after input frame IF1 so that 2m samples from input frames IF1 and IF2 are in sequential order in the buffer. For time scales less than one, the initial filling 220 of the buffer additionally stores samples from frame IF3 and possibly subsequent frames IF4 . . . sequentially following frame IF2.

With the buffer thus filled, step 230 searches a portion of the buffer for a block of m samples that best matches input frame i. For time compression, step 230 searches all blocks that begin at offsets from the beginning of the buffer that are less than or equal to m samples. For time expansion, step 230 searches blocks that begin at an offset from the beginning of the buffer that is less than or equal to n samples.

Figure 3:
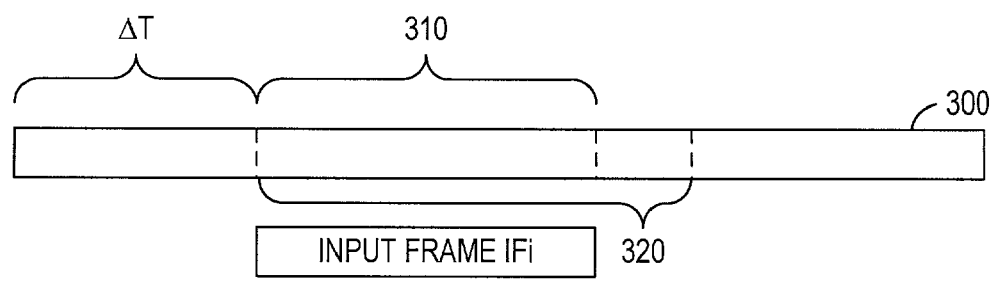
FIG. 3 illustrates an offset identifying a best matching block used in the time scaling process of FIG. 2.

As illustrated in FIG. 3, an offset $\Delta Ti$ from the beginning of a buffer 300 uniquely identifies a best matching block 310 for input frame IFi. Offset $\Delta Ti$ also identifies a best matching block 320 containing g samples. For time compression (e.g., a time scale greater than 1), block 320 and 310 are identical. For time expansion (e.g., a time scale less than 1), block 310 is a subset of block 320.

In step 240, time scaling process 200 modifies the content of buffer 300 by combining g samples in best match block 320 in buffer 300 with g samples of source data including frame IFi. For time compression, the source data is input frame IFi (initially IF2). For time expansion, the source data is n sequential samples starting with input frame IFi.

Figure 4:
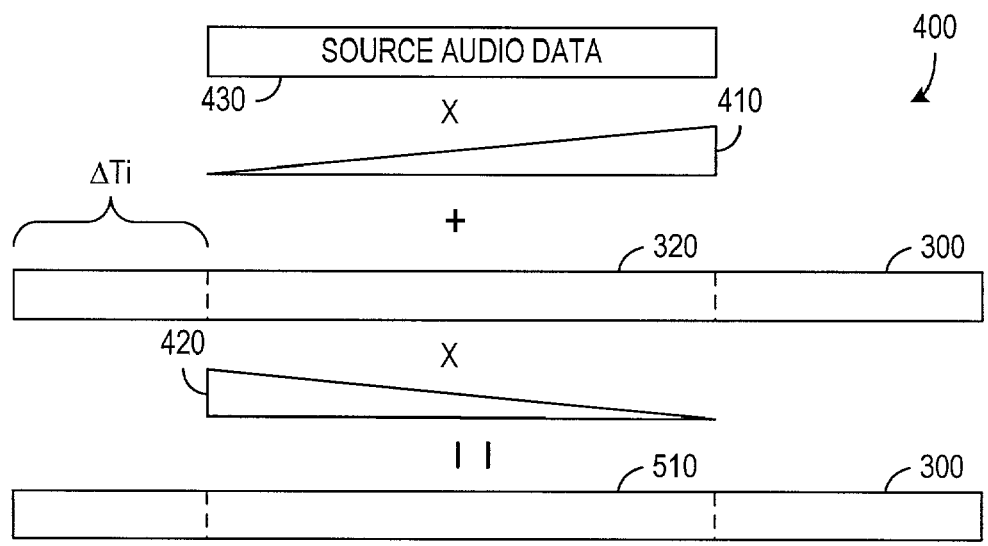
FIG. 4 illustrates a process for generating time-scaled data using the best matching data blocks.
Figure 5:
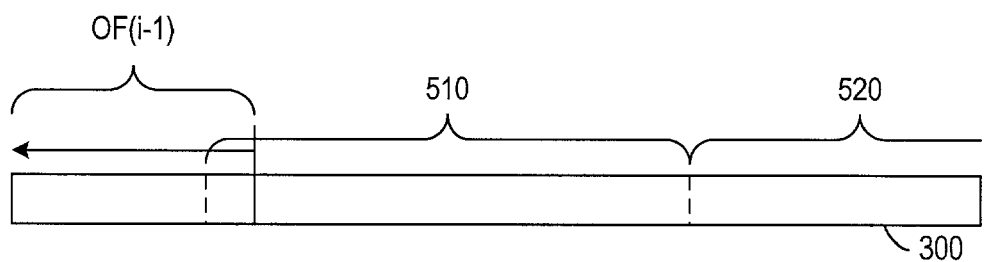
FIG. 5 illustrates output and filling processes for a buffer used in the time scaling process of FIG. 2.

FIG. 4 illustrates an exemplary combination process 400. For combination process 400, each sample in the source data or best match block 320 has a sample index j having values 1 to g assigned according to the sample's order in the source data or the best matching block. For each value of the sample index j, combination process 400 multiplies the corresponding sample in the source data by a corresponding value F1(j) of a weighting function 410 and multiplies the corresponding sample in best matching block 320 by a corresponding value F2(j) of a weighting function 420. The two products corresponding to the same sample index are added to generate a corresponding modified sample that is stored in buffer 300 in storage locations previously occupied by best matching block 310. As a result, step 240 replaces block 320 in buffer 300 with a modified block 510.

In an exemplary embodiment, the values F1(j) and F2(j) of weighting functions 410 and 420 vary with the sample index j and are such that the two weight values corresponding to the same sample index add up to one (e.g., F1(j)+F2(j)=1 for all j=1 to g). Additionally, weighting function 420 has weight F2(1) equal to 1 to preserve continuity of sample values at offset ΔTi from the beginning of buffer 300, and weighting function 410 has weight F1(g) equal to 1 for continuity with sample values to be stored buffer 300 following modified block 510.

Step 250 generates an output frame OF(i-1) by left shifting n samples out of buffer 300. After which, step 260 increments the frame index i, and decision step 270 determines whether process 200 has reached the last input frame IFX. If there are more input frames to time-scale, process 200 jumps back to step 220 and fills the portion of buffer 300 immediately following the shifted position of modified block 510 with input data immediately following the last source data in step used in step combining 240. Steps 220, 230, 240, and 250 are repeated for each input frame IF2 to IFX to output time-scaled frames OF1 to OF(X-1). After the last input frame IFX, process 200 branches from decision step 270 to step 280, which generates the last output frame OFX.

For time scaling process 200, search step 230, which finds a best matching block, requires the most processing power. In particular, for each value of frame index i, search 230 of FIG. 3 generally requires comparing source data to g candidate blocks, and each comparison generally requires about 3m arithmetic operations, e.g., a subtraction, absolute value or square determination, and accumulate operation for each sample in the input frame. Accordingly, search 230 requires about 3m*g arithmetic operations per frame. In contrast, the combination operation 400 of FIG. 4 requires 3m operations, e.g., two multiplications and an addition for each value of the sample index j. In an exemplary process where each input frame contains 440 samples (m=440) and the scale factor S is 2 (n=220), search step 230 requires about 220 times as many arithmetic operations as does combination step 240.

Figure 6:
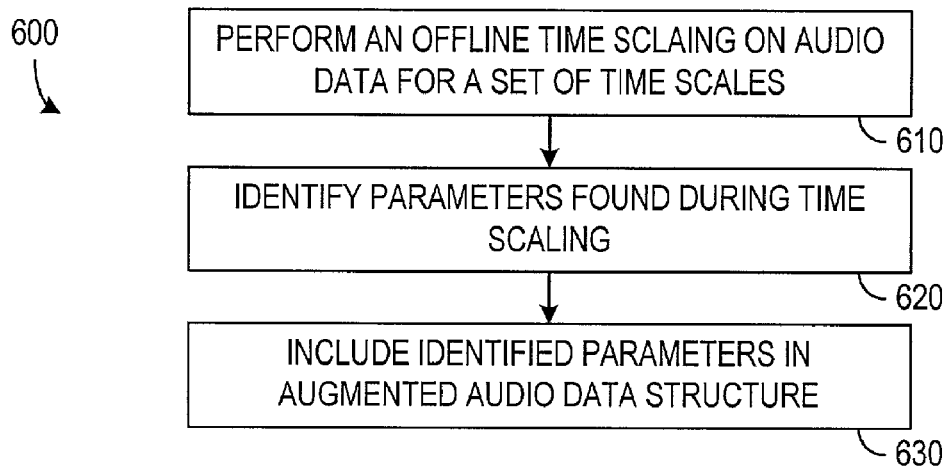
FIG. 6 is a flow diagram of a process for constructing an augmented audio data structure that simplifies real-time time scaling of audio data.

FIG. 6 illustrates a process 600 for generating an augmented audio data structure for use in time scaling in accordance with an embodiment of the invention that reduces the number of arithmetic operation required for time scaling. Process 600 begins in step 610 by performing time scaling on input audio data using a series of different time scales. In particular, for each time scale, step 610 applies a time scaling process such as time scaling process 200 to input audio data. Step 620 identifies specific parameters found during the time scaling of step 610, and step 630 incorporates the parameters in an augmented audio data structure.

The specific parameters in the augmented audio data structure generally depend on the time scaling process employed. In an embodiment using time scaling process 200, time scaling step 610 determines a set of offsets ΔT(k,i) for k ranging over the set of scale factors and i being the frame index (i=1 to X). Each offset ΔT(k,i) identifies a best match block combined with source data including input frame IFi in a time scaling process corresponding to the time scale index k. Step 620 identifies parameters representing the offsets ΔT(k,i), and step 630 incorporates those parameters in the audio data structure.

In an alternative embodiment, time scaling step 610 classifies the audio content of frames or sections of audio data and uses different time scaling processes or time scales on the different input audio frames or sections according to their audio content. Using this technique, a non-linear time scaling process can more aggressively time scale frames containing less important data and while providing less time scaling to more critical information. More specifically, in one embodiment, step 610 identifies which frames correspond to silence (e.g., frames that have a total or average energy less than some threshold), and as parameters, step 620 identifies flags that indicate which input frames correspond to silence. Other time scaling processes use other information that can be represented with parameters that steps 620 and 630 identify and include in the augmented data structure.

Figure 7:
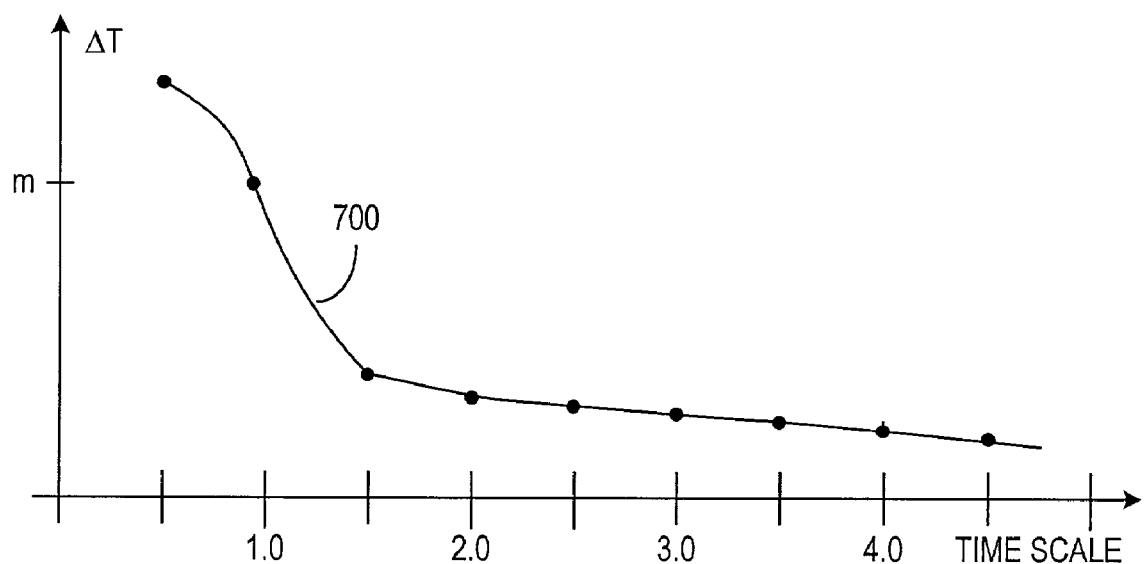
FIG. 7 illustrates an example of the time scale dependence of the offset to a best matching block.

In accordance with one exemplary embodiment of the invention, the augmented data structure representing the audio includes input frames IF1 to IFX, and associated with each input frame IFi are parameters that identify the offsets ΔT(k,i) for time scale index k ranging over the set of time scale values. FIG. 7 shows a plot 700 of the offset ΔT for a particular frame as a function of the time scale S. For a time scale of one, offset ΔT is m, but offset ΔT more generally depends on the time scale and the content of the audio data. Preferably, the parameters associated with the frame indicate a fairly continuous relationship, such as the shape of plot 700 so that interpolation can identify an offset ΔT on plot 700 for any time scale S. Many users will perceive a poorer sound quality if time scaling uses an inaccurate determination of the offset ΔT, e.g., an offset not on plot 700 for a frame.

In the exemplary embodiment of the invention, step 610 performs eight time scaling operations, one for each time scale k between 0.5 and 4.0 in steps of 0.5, and the parameters added to the audio data structure for each input frame are the offsets ΔT(k) identifying best matching block for the input frame and the time scale k. When each input frame contains 440 samples, the addition of eight parameters increases the total amount of audio data by less than about 2%.

Process 600 is preprocessing that is performed before the augmented audio data is used in a time-scaled presentation. Accordingly, process 600 generally does not need to be performed in real-time. However, a powerful processing system can perform process 600 in real-time if real-time scaling is necessary or desirable for direct broadcast to a presentation system.

Figure 8:
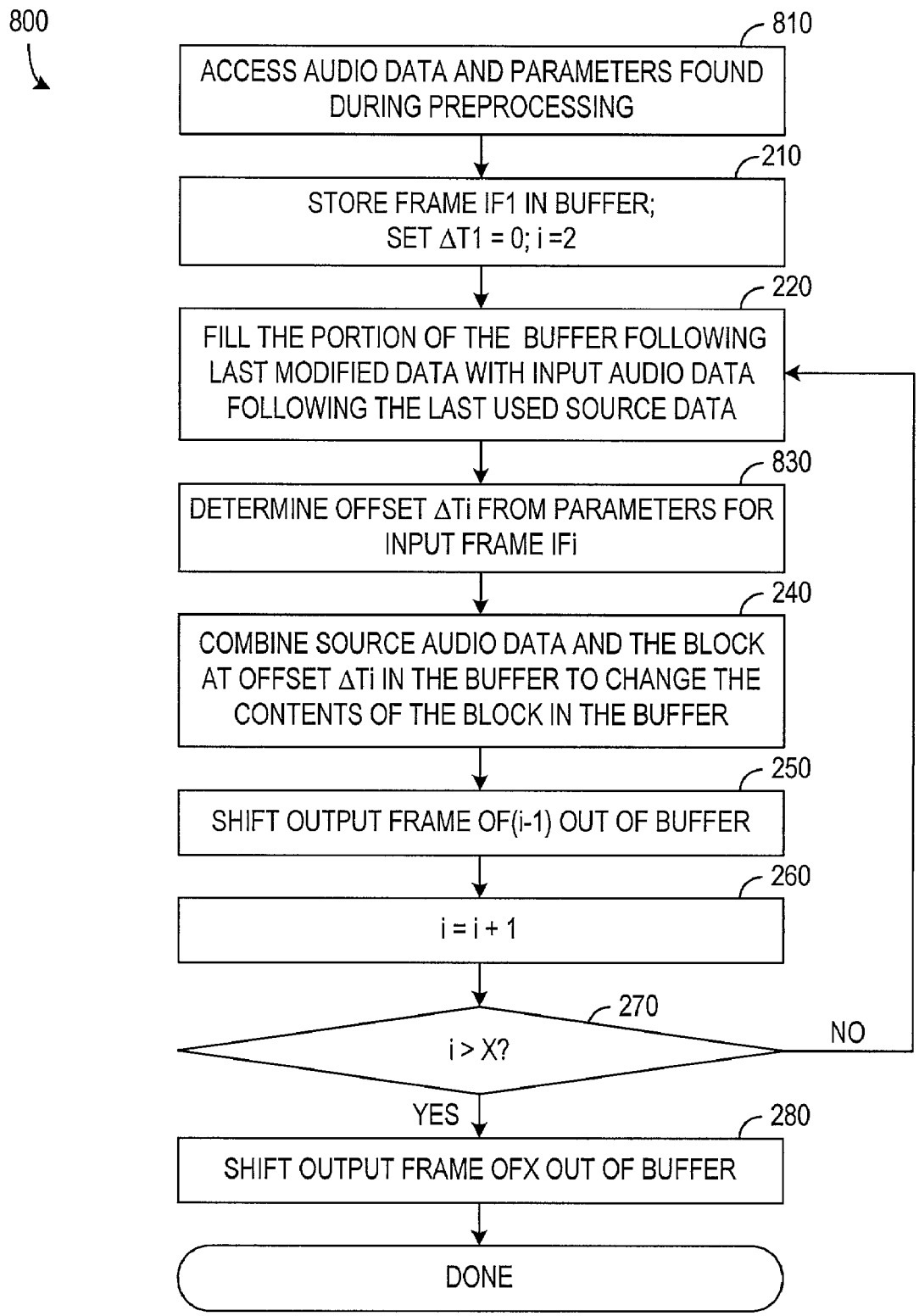
FIG. 8 is a flow diagram of a time scaling process using an augmented audio data structure.

FIG. 8 is a flow diagram of a time scaling process 800 that uses augmented audio data such as provided by process 600 (FIG. 6) to simplify the time scaling process 200 of FIG. 2. In step 810, the presentation system, which can be a low processing power system such as a portable telephone or PDA, accesses the augmented audio data. A wide variety of methods can provide the augmented audio data to the presentation system. For example, the augmented data can be stored on a medium such as a CD, a DVD, or other storage device that the presentation system can access, and the presentation system could retrieve the augmented audio data from an internal drive or memory that is part of the presentation system. Alternatively, the augmented audio data can be directly broadcast to the presentation system via a network such as a LAN, a telephone network, or the Internet.

Steps 210, 220, 830, 240, 250, 260, 270, and 280 perform the time scaling operation in the presentation system. This time scaling operation differs from the time scaling operation of FIG. 2 in the way step 830 finds the best matching block. Otherwise, steps 210, 220, 240, 250, 260, 270, and 280 are as described above in regard to FIG. 2.

To find the best matching block for input frame IFi, step 830 uses the parameters from the augmented audio data structure to determine an offset ΔTi corresponding to the currently selected time scale. For example, if the parameters are the offsets ΔT(k,i) for discrete values k of the time scale and the selected time scale S corresponds to one of the discrete values k, step 830 simply accesses and uses the correct one of the offsets provided for input frame IFi. Alternatively, step 830 can interpolate between the provided offsets to determine an offset for a time scale other than those corresponding to offset provided in the augmented data. Even if interpolation is required, determining the offset using the augmented audio data typically requires about two orders of magnitude fewer arithmetic operations than would a search for the best matching block.

Figure 9:
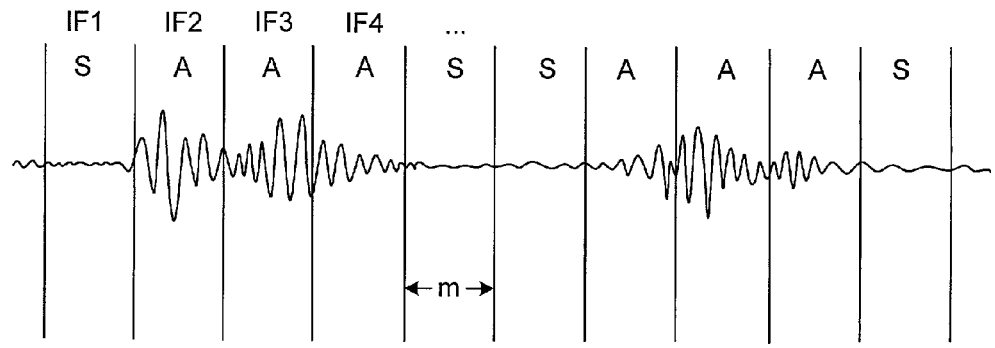
FIG. 9 shows a waveform for a sound containing periods of silence that a non-linear time scaling process can remove or otherwise specially treat.

The use of time scaling parameters can be applied to linear time scaling such as illustrated in FIGS. 2 and 8 and to non-linear time scaling. One type of non-linear time scaling removes or otherwise specially treats sections of silence to time scale the input audio for playing in a shorter time. FIG. 9 illustrates an audio waveform 900 that includes input frames IF1, IF2, etc. Each frame IF1, IF2, . . . can be classified as either silence or not by comparing a threshold level to a ratio ENERGY/ZC of the average audio energy ENERGY in the frame and the number ZC of zero crossings in the frame. Equation 1 indicates the average energy in an input frame containing m audio samples $a_j$. The number ZC of zero crossing in a frame can be determined from a count of the number of changes in sign of the samples in the frame.

Equation 1:

$$\text{ENERGY} = \frac{1}{m} \cdot \sum_{j=1}^{m} a_j^2$$

In accordance with an exemplary embodiment of the invention, the parameters in an augmented audio data structure indicate which of the frames of audio correspond to silence. For example, each frame can have a 1-bit flag that is set to indicate whether the frame corresponds to silence. A presentation system that is performing time scaling does not need to calculate the energy or count zero crossings in each frame and can instead use the flags when selecting frames for special treatment during real-time, non-linear time scaling.

One specific application of the above-described processes is in a voice mail system or other information system where a server or other device stores recorded messages such as telephone messages, news, or presentations. The server can construct the augmented audio data with time scaling parameters, and a telephone or other device retrieving voice mail or other information can use the augmented audio data to perform real-time, high-quality time scaling if the user would like to speed up or slow down the play rate of the message being retrieved.

As noted above, the use of an augmented data structure including time scaling parameters can reduce the processing power required for real-time time scaling of audio, while the augmented data structure is only slightly larger than the original audio data. However, for real-time time compression, a player must receive the input audio frames (and additionally the parameters) at a rate that is higher than the sampling frequency for playing of the output frames. In particular, for a time scale of two, a player performing time scaling requires the input audio data at a rate that is at least twice the sampling frequency. The data rate required for receipt of the augmented data structure can be a problem in systems having limited transmission bandwidth. (In contrast, for real-time time expansion of audio, transmission of the augmented audio data structure generally requires less bandwidth than does transmission of the time-expanded data.)

Figure 10:
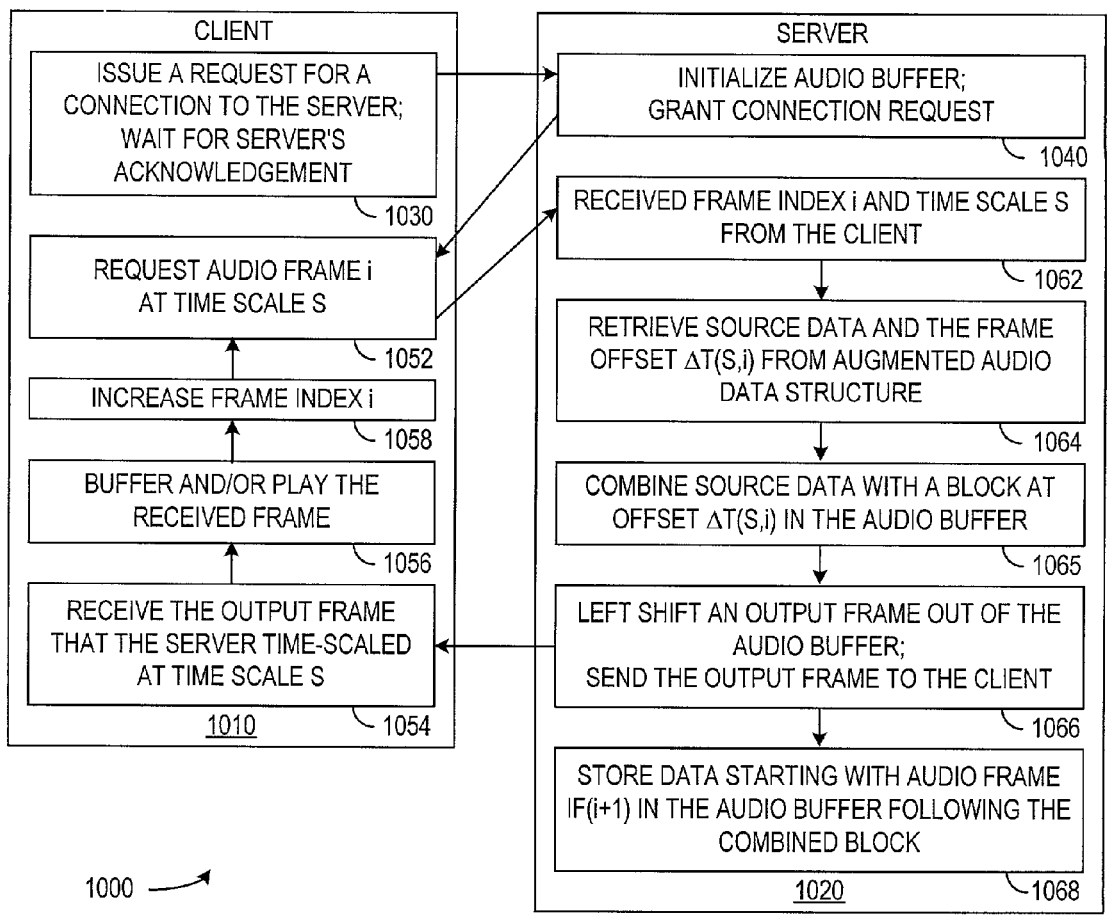
FIG. 10 is a block diagram of a system in which a server uses an augmented audio data structure to construct time-scaled audio data that the server transmits to a player.

FIG. 10 illustrates a system 1000 in accordance with an embodiment of the invention that reduces the bandwidth requirements for real-time time scaling. System 1000 includes a client 1010 connected to a server 1020. In alternative embodiments of the invention, client 1010 can be a computer, a PDA, or a telephone that uses a network such as a LAN, WAN, the Internet, or a telephone network to connect to server 1020. Server 1020 can be a computer storing at least one presentation that has an augmented data structure to represent the audio portion of the presentation.

In operation, client 1010 issues a request 1030 for a connection to server 120 and waits for server 1020 to grant the connection. In a response 1040, server 1020 identifies the presentation that client 1010 is requesting, initializes an audio buffer for the presentation, and grants the connection to client 1010.

Once the connection is established, client 1010 issues a request 1052 for a particular audio frame having an index i and a time scale S. Server 1020 receives frame index i and time scale S and retrieves source audio samples including the associated input frame IFi and associated parameters from the augmented data structure. Server 1020 then generates an output frame for transmission to client 1010. In particular, for the time scaling process of FIG. 8, server 1020 determines an offset ΔTi for the frame index i and time scale S, combines source data including input frame IFi with the buffered block that offset ΔTi identifies. Server 1020 then left shifts the output frame out of the buffer, transmits the output frame to client 1010, and then refills the buffer using audio data starting with the next input frame.

Client 1010 receives the transmitted output frame, stores the received output frame in a play buffer, increments the frame index, and requests the next frame from server 1020. Client 1010 does not require the input frame or the parameters that server 1020 uses in generating the output frame. Accordingly, system 1000 requires an audio bandwidth that is about equal to the sampling frequency for playing the audio.

Although the invention has been described with reference to particular embodiments, the description is only an example of the invention's application and should not be taken as a limitation. For example, although the above describes audio data in a presentation, the presentation may include further multi-media information such as images or video. Additionally, although the above describes particular formats for audio data with fixed frame size, time scaling procedures using variable frame sizes are also suitable for use in alternative embodiments of the invention. Various other adaptations and combinations of features of the embodiments disclosed are within the scope of the invention as defined by the following claims.

What is claimed is:

1. A process comprising:
   preprocessing audio data that includes a sequence of input frames to determine parameters indicating intermediate results in a process for time scaling of respective frames of the audio data, wherein the preprocessing is performed before commencement of a real-time time scaling of the audio data, and the parameters comprise a plurality of offsets for each input frame, the plurality of offsets for each input frame corresponding to different time scales and each offset identifying for an associated input frame a block of samples for use in generating time-scaled data from the associated input frame:
   providing the audio data and the parameters to a device; and
   having the device use the parameters in the real-time time scaling of the audio data to generate time-scaled audio, wherein using the parameters in the real-time time scaling requires less processing power than would time scaling of the audio data without using the parameters.

2. The process of claim 1, wherein providing the audio data and parameters compnses recording the audio data and the parameters on a storage media that the device can read, and the device accessing the storage media to read the audio data and the parameters.

3. The process of claim 2, wherein the storage media is a disk.

4. The process of claim 1, wherein providing the audio data and the parameters comprises transmitting the audio data and the parameters via a network to the device.

5. The process of claim 1, wherein the device performs the preprocessing of the audio data to determine the parameters and stores the audio data and the parameters for later use during the real-time time scaling of the audio data.

6. The process of claim 1, wherein one or more of the parameters classify respective audio contents of the input frames.

7. The process of claim 6, wherein the parameters identify which of the input frames represent silence.

8. The process of claim 6, wherein having the device use the parameters comprises processing the input frames that the parameters indicate represent silence differently from processing of the input frames that the parameters indicate are not silence.

9. The process of claim 1, wherein a voice mail system performs the preprocessing of the audio data to determine the parameters associated with time scaling of the audio data.

10. The process of claim 9, wherein the device tomprises a telephone that receives audio data and the parameters from the voice mail system.

11. The process of claim 1, wherein a server performs the preprocessing of the audio data to determine the parameters associated with time scaling of the audio data.

12. The process of claim 11, wherein the device comprises a telephone that receives audio data and the parameters from the server.

13. The process of claim 1, wherein the device comprises a server that performs the preprocessing of the audio data to determine the parameters associated with time scaling of the audio data, stores the audio data and the parameters for later use, and performs real-time time scaling to provide the time-scaled audio data to a player.

14. A process for time scaling of audio, comprising:
    preprocessing audio data to determine one or more parameters indicating a relation between time scales and offsets of a frame of the audio data relative to preceding audio data during a time scaling process;
    receiving the frame of the audio data with the parameters;
    using the parameters to determine an offset that corresponds to a selected time scale; and
    generating a time-scaled frame using the audio data and the offset.

15. The process of claim 14, wherein the parameters comprise a plurality of preprocessed offsets that respectively correspond to a plurality of time scales.

16. The process of claim 15, wherein using the parameters comprises interpolating between the preprocessed offsets to determine the offset corresponding to the selected time scale.

17. The process of claim 14, further comprising a listener selecting the selected time scale for presentation of the audio.

18. A computer readable medium containing an audio data structure, wherein the audio data structure comprises:
    a plurality of frames respectively corresponding to sequential sections of audio, each frame comprising a plurality of samples of the corresponding section of audio; and
    one or more parameters for each frame, the parameters providing information that is derived from the samples and indicates an intermediate result of a time scaling process, wherein the one or more parameters for a frame comprises a plurality of offsets that respectively correspond to a plurality of time scales, each offset identifying a block of the samples that are used to generate time-scaled data that corresponds to the time scale corresponding to the offset, and determination of the intermediate result from the parameters reduces an amount of processing power needed for time scaling the audio data.

19. The medium of claim 18, wherein one or more parameters indicate which of the frames correspond to silent sections of the audio.

20. The media medium of claim 18, wherein the media comprises a disk on which the frames and the parameters are recorded.

* * * * *

UNITED STATES PATENT AND TRADEMARK OFFICE
CERTIFICATE OF CORRECTION

| | | |
|---|---|---|
| PATENT NO. | : 7,171,367 B2 | Page 1 of 1 |
| APPLICATION NO. | : 10/010514 | |
| DATED | : January 30, 2007 | |
| INVENTOR(S) | : Kenneth H.P. Chang | |

It is certified that error appears in the above-identified patent and that said Letters Patent is hereby corrected as shown below:

At column 4, line 36, delete "output frame" and insert --output frames--.
At column 5, line 38, delete "step combining 240" and insert --combining step 240--.
At column 6, line 22, delete "and".
At column 6, line 62, delete "scaling" and insert --time-scaling--.
At column 9, line 10, delete "tomprises" and insert --comprises--.
At column 10, line 54, delete "18" and insert --claim 18--.
At column 10, line 57, delete "media medium" and insert --medium--.

Signed and Sealed this

Fourth Day of September, 2007

JON W. DUDAS
*Director of the United States Patent and Trademark Office*